United States Patent
Chen et al.

(10) Patent No.: US 10,862,700 B2
(45) Date of Patent: Dec. 8, 2020

(54) METHOD AND APPARATUS FOR PROCESSING IDENTIFICATION DATA

(71) Applicant: Alibaba Group Holding Limited, Grand Cayman (KY)

(72) Inventors: Chen Chen, Zhejiang (CN); Mingjun Zhang, Zhejiang (CN); Shengdong Ding, Zhejiang (CN)

(73) Assignee: Alibaba Group Holding Limited

( * ) Notice: Subject to any disclaimer, the term of this patent is extended or adjusted under 35 U.S.C. 154(b) by 209 days.

(21) Appl. No.: 16/041,414

(22) Filed: Jul. 20, 2018

(65) Prior Publication Data

US 2018/0331847 A1 Nov. 15, 2018

Related U.S. Application Data

(63) Continuation of application No. PCT/CN2017/070974, filed on Jan. 12, 2017.

(30) Foreign Application Priority Data

Jan. 21, 2016 (CN) .......................... 2016 1 0041874

(51) Int. Cl.
*H04L 12/28* (2006.01)

(52) U.S. Cl.
CPC ........ *H04L 12/2834* (2013.01); *H04L 12/281* (2013.01); *H04L 12/2814* (2013.01); *H04L 12/282* (2013.01)

(58) Field of Classification Search
CPC ............... H04L 12/2834; H04L 12/281; H04L 12/2814

(Continued)

(56) References Cited

U.S. PATENT DOCUMENTS

| 2015/0061844 A1 | 3/2015 | Miramontes |
| 2017/0052688 A1* | 2/2017 | Evans ...................... G06F 16/21 |
| 2017/0063611 A1* | 3/2017 | Sheba ...................... H04L 41/22 |

FOREIGN PATENT DOCUMENTS

| CN | 103000008 A | 3/2013 |
| CN | 103577198 A | 2/2014 |

(Continued)

OTHER PUBLICATIONS

Translation of Chinese International Search Report dated Apr. 17, 2017, from corresponding Chinese PCT Application No. PCT/CN2017/070974, 2 pages.

(Continued)

*Primary Examiner* — Glenford J Madamba
(74) *Attorney, Agent, or Firm* — Lee & Hayes, P.C.

(57) ABSTRACT

Methods and apparatuses for processing identification data are provided. The method includes acquiring device data based on an interaction between a controlling device and a controlled device, wherein the device data is related to a state of the controlled device; extracting logic information and attribute information according to the device data; and establishing a logic database of the controlled device, wherein the logic database includes a correspondence between the attribute information and the logic information. By establishing a logic database, data meanings may be interpreted from device private data to complete identification of the device private data, thus implementing interoperation of Internet of Things data, and improving the use value of the IoT.

20 Claims, 7 Drawing Sheets

(58) Field of Classification Search
USPC .......................................................... 709/223
See application file for complete search history.

(56) References Cited

FOREIGN PATENT DOCUMENTS

| | | |
|---|---|---|
| CN | 103685746 A | 3/2014 |
| CN | 104023052 A | 9/2014 |
| CN | 105139634 A | 12/2015 |
| CN | 105144636 A | 12/2015 |

OTHER PUBLICATIONS

Translation of Chinese Written Opinion dated Apr. 17, 2017, from corresponding Chinese PCT Application No. PCT/CN2017/070974, 6 pages.
English translated copy of the First Chinese Office Action dated Nov. 18, 2019 for Chinese Patent Application No. 201610041874.0, a counterpart foreign application of U.S. Appl. No. 16/041,414, 18 pages.

* cited by examiner

METHOD AND APPARATUS FOR PROCESSING IDENTIFICATION DATA

CROSS REFERENCE TO RELATED PATENT APPLICATIONS

This application claims priority to and is a continuation of PCT Patent Application No. PCT/CN2017/070974, filed on 12 Jan. 2017, which claims priority to Chinese Patent Application No. 201610041874.0, filed on 21 Jan. 2016 and entitled "METHOD AND APPARATUS FOR PROCESSING IDENTIFICATION DATA", which are incorporated herein by reference in their entirety.

TECHNICAL FIELD

The present disclosure relates to Internet of Things (IoT) data processing technologies, and, more particularly, to methods and apparatuses for processing identification data.

BACKGROUND

The IoT is a network that implements interoperation of all independently addressable ordinary physical objects based on information carriers such as the Internet, a conventional telecommunication network, and the like. For example, the IoT connects all things to the Internet by using information sensing devices such as radio frequency identification (RFID) devices, infrared sensors, laser scanners, and so on, to exchange information, i.e., correlate things with each other, thus implementing intelligent identification and management.

The value of the IoT is reflected in IoT data. Various data needs to flow between different IoT nodes. However, there is no universal IoT data protocol currently in the industry. As a result, various devices follow different data protocols respectively, failing to realize interoperation of IoT data. In particular, IoT cloud platforms are mainly constructed by several oligarchs in the industry, and many third-party device manufacturers and Application (App) developers need to access the IoT cloud platforms to implement the function of connecting things. However, since there is no universal IoT data protocol, different device manufacturers need to set device data according to different data formats, that is, different device manufacturers use different data formats, thus forming device private data (private data). Therefore, how to interpret data meanings from the device private data or translate a control instruction into device-executable private data becomes a key to interoperation of IoT data.

Currently, intelligent identification and management are implemented mainly in the following two manners: One manner is to formulate a data standard in advance to standardize data names and formats, that is, conversion between "device private data" and "standard data" is implemented on a device side or a cloud platform, and an App end sends and receives comprehensible standard data. For the other manner, no data standard is formulated, and an App end sends and receives "device private data". That is, the App adapts to various private device data protocols, to access and control devices. Forms and functions of IoT devices are still differentiated progressively. A "large and all-inclusive" data standard that covers all types of devices also needs constant correction. Thus, the problem in data compatibility caused by the iteration of standards is also difficult to solve. If the standard is formulated according to current forms of various industries, how to interoperate data between industries becomes another problem. Therefore, it is difficult to unify data formats of all devices by using the first manner of "formulating a data standard in advance", i.e., it is difficult to formulate a reasonable data standard. For the second manner in which "no data standard is formulated", the App may adapt to device private data to realize data interoperation between the App and a specified device; however, if the private data flows out of a specified scope, i.e., the "adapted App" and "specified device", a third party still cannot understand the private data of the specified device.

Apparently, in the existing solution of intelligent identification and management based on a cloud platform, the cloud platform is incapable of identifying device private data, reducing the use value of the IoT.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides methods and apparatuses for identification data, to solve the problem in IoT data interoperation.

In order to solve the foregoing problem, the example embodiments of the present disclosure disclose a processing method for identification data, including:
  acquiring device data based on an interaction between a controlling device and a controlled device, wherein the device data is related to a state of the controlled device;
  extracting logic information and attribute information according to the device data; and
  establishing a logic database of the controlled device, wherein the logic database includes a correspondence between the attribute information and the logic information.

For example, the step of acquiring device data based on an interaction between a controlling device and a controlled device includes:
  acquiring the device data according to interaction data when the interaction data is transmitted between the controlling device and the controlled device.

For example, the step of acquiring the device data according to interaction data when the interaction data is transmitted between the controlling device and the controlled device includes:
  transmitting to the controlled device an operation instruction submitted by the controlling device; and
  collecting state change data and the operation instruction that are submitted by the controlling device, when the controlled device responds to the operation instruction.

For example, the step of extracting logic information and attribute information according to the device data includes:
  extracting, from the operation instruction, instruction data corresponding to an operation parameter, and using the instruction data as the attribute information of the controlled device; and
  extracting, from the state change data, state change information corresponding to a logic parameter, determining a logic instruction name based on the extracted state change information, and using the logic instruction name as the logic information of the controlled device.

For example, the step of establishing a logic database of the controlled device includes:

establishing a correspondence between the instruction data and the logic instruction name; and saving the correspondence between the instruction data and the logic instruction name, to generate a logic instruction database of the controlled device.

For example, the step of acquiring the device data according to interaction data when the interaction data is transmitted between the controlling device and the controlled device includes:

transmitting to the controlling device running state data submitted by the controlled device; and collecting the running state data and state change data that is submitted by the controlling device, when the controlling device responds to the running state data.

For example, the step of extracting logic information and attribute information according to the device data includes:

extracting, from the running state data, state feature data corresponding to a state parameter, and using the state feature data as the attribute information of the controlled device; and extracting, from the state change data, state change information corresponding to a logic parameter, determining a logic state name based on the extracted state change information, and using the logic state name as the logic information of the controlled device.

For example, the step of establishing a logic database of the controlled device includes:

establishing a correspondence between the state feature data and the logic state name; and saving the correspondence between the state feature data and the logic state name, to generate a logic instruction database of the controlled device For example, the state change data includes data extracted according to a change in a display interface of the controlling device.

For example, the state change data includes: state label data, state type data and state alteration data, wherein the state label data and the state type data are used for determining the logic instruction name or the logic state name, and the state alteration data is used for displaying the state of the controlled device in the controlling device.

For example, the method further includes:

when the controlled device cannot identify device data of the controlling device, mapping the device data of the controlling device according to the logic database, to obtain corresponding converted data; and sending the converted data to the controlled device.

The example embodiments of the present disclosure further disclose a processing apparatus for identification data, including:

a data acquisition module configured to acquire device data based on an interaction between a controlling device and a controlled device, wherein the device data is related to a state of the controlled device;

an information extraction module configured to extract logic information and attribute information according to the device data; and a database establishment module configured to establish a logic database of the controlled device, wherein the logic database includes a correspondence between the attribute information and the logic information.

For example, the data acquisition module is configured to acquire the device data according to interaction data when the interaction data is transmitted between the controlling device and the controlled device.

For example, the data acquisition module includes:

an instruction transmitting sub-module configured to transmit to the controlled device an operation instruction submitted by the controlling device; and a collection sub-module configured to collect state change data and the operation instruction that are submitted by the controlling device, when the controlled device responds to the operation instruction.

For example, the information extraction module includes:

an instruction extraction sub-module configured to extract, from the operation instruction, instruction data corresponding to an operation parameter, and use the instruction data as the attribute information of the controlled device; and an instruction name determining sub-module configured to extract, from the state change data, state change information corresponding to a logic parameter, and use a logic instruction name based on the extracted state change information as the logic information of the controlled device.

For example, the database establishment module includes:

a first establishment sub-module configured to establish a correspondence between the instruction data and the logic instruction name; and a first generation sub-module configured to save the correspondence between the instruction data and the logic instruction name, to generate a logic instruction database of the controlled device.

For example, the data acquisition module includes:

a state transmitting sub-module configured to transmit to the controlling device running state data submitted by the controlled device; and a collection sub-module configured to collect the running state data and state change data that is submitted by the controlling device, when the controlling device responds to the running state data.

For example, the information extraction module includes:

a state feature extraction sub-module configured to extract, from the running state data, state feature data corresponding to a state parameter, and use the state feature data as the attribute information of the controlled device; and a state name determining sub-module configured to extract, from the state change data, state change information corresponding to a logic parameter, determine a logic state name based on the extracted state change information, and use the logic state name as the logic information of the controlled device.

For example, the database establishment module includes:

a second establishment sub-module configured to establish a correspondence between the state feature data and the logic state name; and a second generation sub-module configured to save the correspondence between the state feature data and the logic state name, to generate a logic instruction database of the controlled device.

For example, the state change data includes data extracted according to a change in a display interface of the controlling device.

For example, the state change data includes: state label data, state type data and state alteration data, wherein the state label data and the state type data are used for determining the logic instruction name or the logic state name, and the state alteration data is used for displaying the state of the controlled device in the controlling device.

For example, the apparatus further includes:
a device data mapping module configured to: when the controlled device cannot identify device data of the controlling device, map the device data of the controlling device according to the logic database, to obtain corresponding converted data; and
a converted data sending module configured to send the converted data to the controlled device.

Compared with the conventional techniques, the example embodiments of the present disclosure have the following advantages:

First, a cloud server in the example embodiments of the present disclosure may acquire device data based on an interaction between a controlling device and a controlled device; determine logic information and attribute information corresponding to the logic information; and establish a logic database of the controlled device, wherein the device data is related to a state of the controlled device. That is, by acquiring interpretation of the controlling device for the device data of the controlled device, a logic database of the controlled device is established, so that data meanings may be interpreted from device private data to complete identification of the device private data, thus implementing interoperation of IoT data, and improving the use value of the IoT.

Second, the cloud server collects data submitted by the controlling device when the controlled device responds to an operation command of the controlling device, extracts, from the device data, a logic instruction name and instruction data corresponding to the operation command, and establishes a logic instruction database of the controlled device, to complete identification of the operation instruction, such that interoperation of IoT data may be implemented based on the logic instruction database.

Third, when the controlling device responds to the running state data of the controlling device, the cloud server collects state change data submitted by the controlling device and the running state data submitted by the controlled device, and establishes a logic state database of the controlled device to complete identification of the running state data, such that interoperation of IoT data may be implemented based on the logic state database.

BRIEF DESCRIPTION OF THE DRAWINGS

To describe the technical solutions in the example embodiments of the present disclosure, the following briefly introduces the accompanying drawings describing the example embodiments. Apparently, the accompanying drawings described in the following merely represent some example embodiments described in the present disclosure, and those of ordinary skill in the art may still derive other drawings from these accompanying drawings without creative efforts.

DETAILED DESCRIPTION

Figure 1:
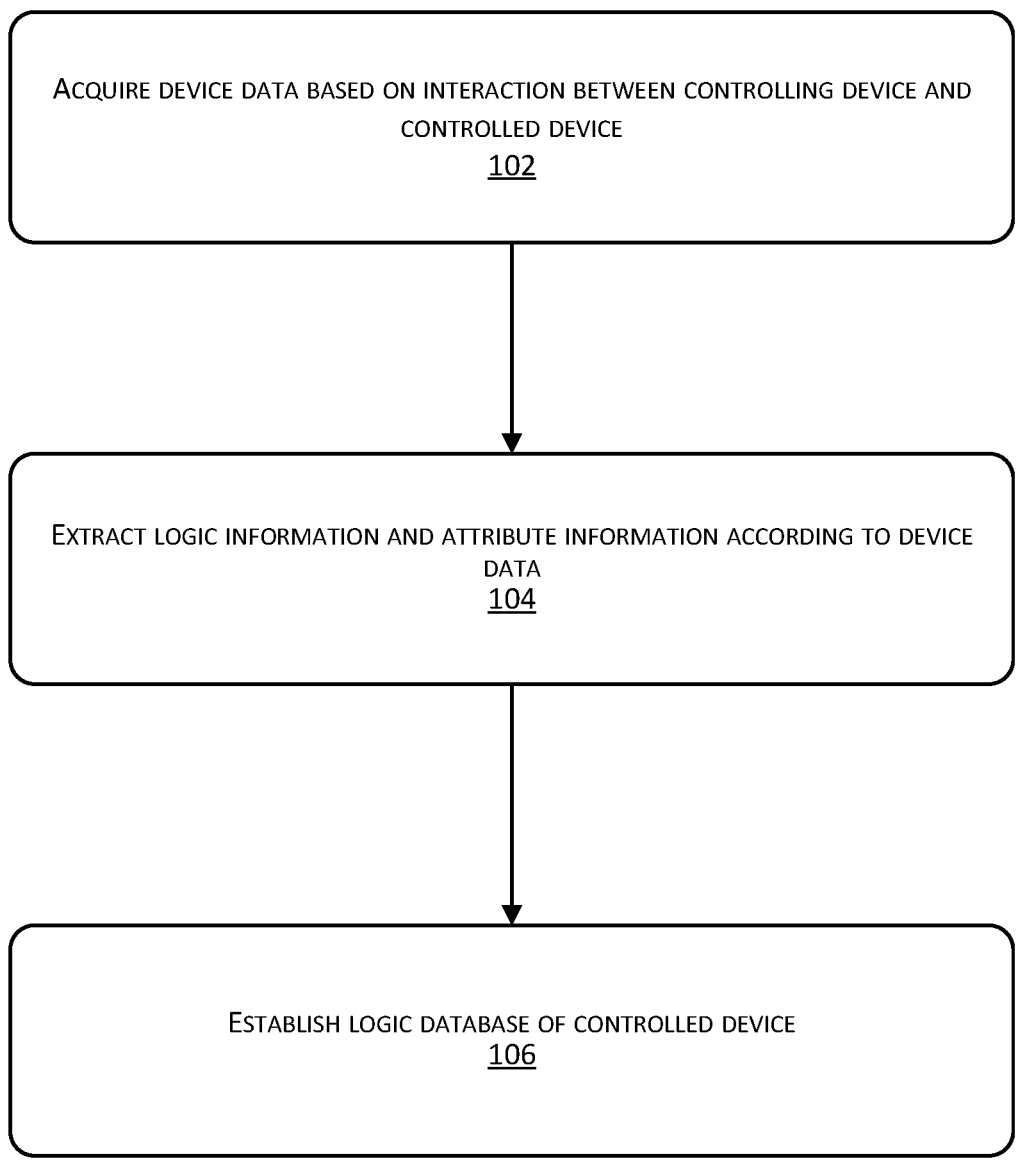
FIG. 1 is a flowchart of steps of a processing method for identification data according to an example embodiment of the present disclosure.

To make the foregoing objectives, features, and advantages of the present disclosure more comprehensible, the present disclosure is described in further detail below with reference to the accompanying drawings and specific implementations.

Based on the IoT technology, a user may control the running state of a controlled device by manipulating a controlling device. For example, when a user and a controlled device are in different places or when it is inconvenient for the user to manipulate the controlled device directly, the user may control the controlled device by using a control on the controlling device or an APP installed on the controlling device, for example, the user may control the on/off state of a light by tapping an APP on a mobile phone.

The controlling device may be adapted to various private device data protocols to control and access the controlled device. The controlling device may include, but not limited to, a mobile phone, a tablet computer, a remote control, and the like. The controlled device may include, but not limited to, a light, an air conditioner, a TV set, an electric cooker, a temperature sensor, and the like. The example embodiments of the present disclosure do not limit the types of the controlled device and the controlling device.

However, for controlled devices produced by different manufacturers, the controlling device needs to send different device private data even if a same command is to be executed. Using turning off a light as an example, assuming that a private data format of a turn-off instruction corresponding to a light from Manufacturer A is "FF00" while a private data format of a turn-off instruction corresponding to a light from Manufacture B is "00FF", an App needs to send "FF00" if the user manipulates an App interface on the controlling device to turn off the light from Manufacturer A, and needs to send "00FF" if the user manipulates the App interface on the controlling device to turn off the light from Manufacturer B. In addition, the user may also determine the current running state of a device according to a display state of the App interface. For example, when the light is in an off state, the APP interface will display a state label (for example, a switch control is displayed in grey) corresponding to the off state of the light; when the light is in an on state, the APP interface will display a state label (for example, a switch control is displayed in green) corresponding to the on state of the light. Apparently, the running state of the controlled device may be controlled by using the APP installed on the controlling device, and the current running state of the controlled device (such as a light) may also be acquired according to a display state of the APP on the controlling device. Therefore, according to the display interface of the controlling device, it may be determined whether the controlling device may control the controlled device.

One of the ideas of the example embodiments of the present disclosure lies in that when the controlling device may control the controlled device, device data is acquired based on an interaction between the controlling device and the controlled device; logic information and attribute information are extracted according to the device data; and a logic database of the controlled device is established, so that data meanings in device private data may be interpreted based on the logic database, thus completing identification of the device private data.

Example Embodiment 1

Referring to FIG. 1, FIG. 1 shows a flowchart of steps of a processing method for identification data according to an example embodiment of the present disclosure. The method may include the following steps:

Step 102: Device data is acquired based on an interaction between a controlling device and a controlled device.

The device data is related to a state of the controlled device, and may include control-related data when the controlling device controls the controlled device, and may also include data such as a state of the controlled device reported by the controlled device to the controlling device.

For example, when manipulating the controlling device, a user may trigger the controlling device to send an operation instruction to the controlled device. That is, the controlling device submits an operation instruction to a cloud server (or referred to as a cloud platform) according to an operation of the user. After receiving the operation instruction submitted by the controlling device, the cloud server may transmit the received operation instruction to the controlled device, such that the controlled device may change its running state according to the control instruction, that is, the controlling device may control the controlled device.

In addition, the controlling device may further change a display interface according to an operation of the user, i.e., generate display state change data (state change data for short), and change the display interface according to the state change data. In addition, the controlling device may further submit the state change data to the cloud server, that is, the cloud server may further collect the state change data of the controlling device.

Certainly, the controlled device may also submit data corresponding to its current running state, i.e., running state data, to the cloud server, such that the controlling device may acquire the running state data currently corresponding to the controlled device, and display the current running state of the controlled device on the display interface. As such, the user may know the running condition of the controlled device in real time, to implement intelligent identification and management. For example, upon receiving the running state data transmitted by the cloud, the controlling device may display the current state of the controlled device on the display interface based on the running state data submitted by the controlled device, that is, the controlling device may change the display interface according to the running state data submitted by the controlled device. Based on the display interface of the controlling device, it is possible to determine whether the controlled device has executed the operation instruction successfully, i.e., determine whether the controlled device responds to the operation instruction submitted by the controlling device; moreover, it is also possible to determine whether the controlling device may display the current running state of the controlled device, i.e., determine whether the controlling device responds to the running state data submitted by the controlled device. When the controlling device may control the controlled device, i.e., when the controlled device responds to the operation instruction submitted by the controlling device, or when the controlling device responds to the state change data submitted by the controlled device, the cloud server may establish a logic database of the controlled device by collecting the state change data and the operation instruction that are submitted by the controlling device, thus implementing identification of the device data.

It should be noted that the device data includes data submitted by the controlling device (such as the state change data and the operation instruction) and data submitted by the controlled device (such as the running state data and collected data). The state change data includes data extracted according to a change in the display interface of the controlling device, for example, state label data, state type data, state alteration data, and so on. The collected data refers to data collected by the controlled device, for example, temperature data collected by a temperature sensor. This example embodiment of the present disclosure does not limit the type of the device data. This example embodiment of the present disclosure is described by using the state change data, the operation instruction and the running state data as an example.

Optionally, the step of acquiring device data based on an interaction between a controlling device and a controlled device may be acquiring the device data according to interaction data when the interaction data is transmitted between the controlling device and the controlled device.

For example, data submitted by the controlling device and the controlled device may be referred to as interaction data. In the process of transmitting the interaction data between the controlling device and the controlled device, the cloud server may acquire device data according to the interaction data. That is, upon detecting that the controlling device may control the controlled device, the cloud server collects data submitted by the controlling device and/or the controlled device.

Step 104: Logic information and attribute information are extracted according to the device data.

In this example embodiment, the controlling device may control the controlled device, that is, the controlling device may parse private data of the controlled device. The cloud server may extract logic information and attribute information according to the acquired device data. The logic information refers to data meanings corresponding to the device data, for example, a logic name. The attribute information refers to data that may be comprehended and executed by the controlling device or the controlled device, for example, instruction data and state data. By extracting the logic information and the attribute information corresponding to the device data and establishing a correspondence between the logic information and the attribute information, a logic database of the device may be established, such that the cloud server may identify the device data based on the logic database.

The cloud server may determine the logic information based on the state change data submitted by the controlling device. For example, the cloud server may extract, from the state change data, state change information corresponding to a preset logic parameter, determine a logic name (such as a logic state name or a logic instruction name) based on the extracted state change information, and use the determined logic name as the logic information of the controlled device. The cloud server may also extract, from the device data, attribute information corresponding to a preset attribute parameter, and use the extracted attribute information as the attribute information of the controlled device. The attribute parameter may include, but not limited to, an operation parameter, a state parameter, a temperature parameter, and so on, and the attribute information may include, but not limited to, operation instruction data (instruction data for short), state feature data, temperature data, and so on, which are not limited in this example embodiment of the present disclosure.

Step 106: A logic database of the controlled device is established.

The logic database includes a correspondence between the attribute information and the logic information.

The cloud server may establish a correspondence between the attribute information and the logic information when extracting the logic information of the controlled device and the attribute information corresponding to the logic information from the device data. After the correspondence between the attribute information and the logic information is established, the cloud server may automatically generate a logic database of the controlled device, and save the logic information, the attribute information, as well as the correspondence between the attribute information and the logic information into the logic database. For example, if a logic instruction name and instruction data are extracted from the device data, a correspondence between the logic instruction name and the instruction data may be established, the logic instruction name, the instruction data as well as the correspondence between the logic instruction name and the instruction data are saved, and a device logic instruction database is updated, thus generating instruction data of the controlled device. If a logic state name and state feature data are extracted from the device data, a correspondence between the logic state name and the state feature data may be established, the logic state name, the state feature data as well as the correspondence between the logic state name and the state feature data are saved, and a device logic state database is updated, thus generating state data of the controlled device.

Certainly, the cloud server may also establish a logic database of the controlling device, for example, a logic instruction database and a logic state database of the controlling device. Data saved in the logic instruction database of the controlling device may include, but not limited to, an operation instruction submitted by the controlling device, a logic instruction name corresponding to the operation instruction, instruction data in the operation instruction, a correspondence between the instruction data and the logic instruction name, and so on. Data saved in the logic state database of the controlling device may include, but not limited to, state change data submitted by the controlling device, a logic instruction name corresponding to the state change data, state feature data corresponding to the state change data, a feature value, a correspondence between the state feature data and the logic state name, and so on. The feature value may be used for determining a state value corresponding to the state feature data, that is, used for determining the current state of the device.

In this example embodiment, the cloud server may complete identification of device data based on a logic database of a device. For example, the cloud server may interpret data meanings of the device data based on logic information, and may further convert, based on attribute information, a received operation instruction into device data that may be parsed by the device. In other words, when the controlling device may control the controlled device, the cloud server acquires interpretation of the controlling device for the device data of the controlled device to complete identification of device private data, thus solving the problem that the cloud server cannot identify device private data.

In this example embodiment of the present disclosure, the cloud server may acquire device data based on an interaction between the controlling device and the controlled device, and extract logic information and attribute information according to the device data. That is, a logic database of the device is established by using data meanings interpreted by the controlling device from the device private data, thus implementing interoperation of IoT data and improving the use value of the IoT.

Example Embodiment 2

Figure 2:
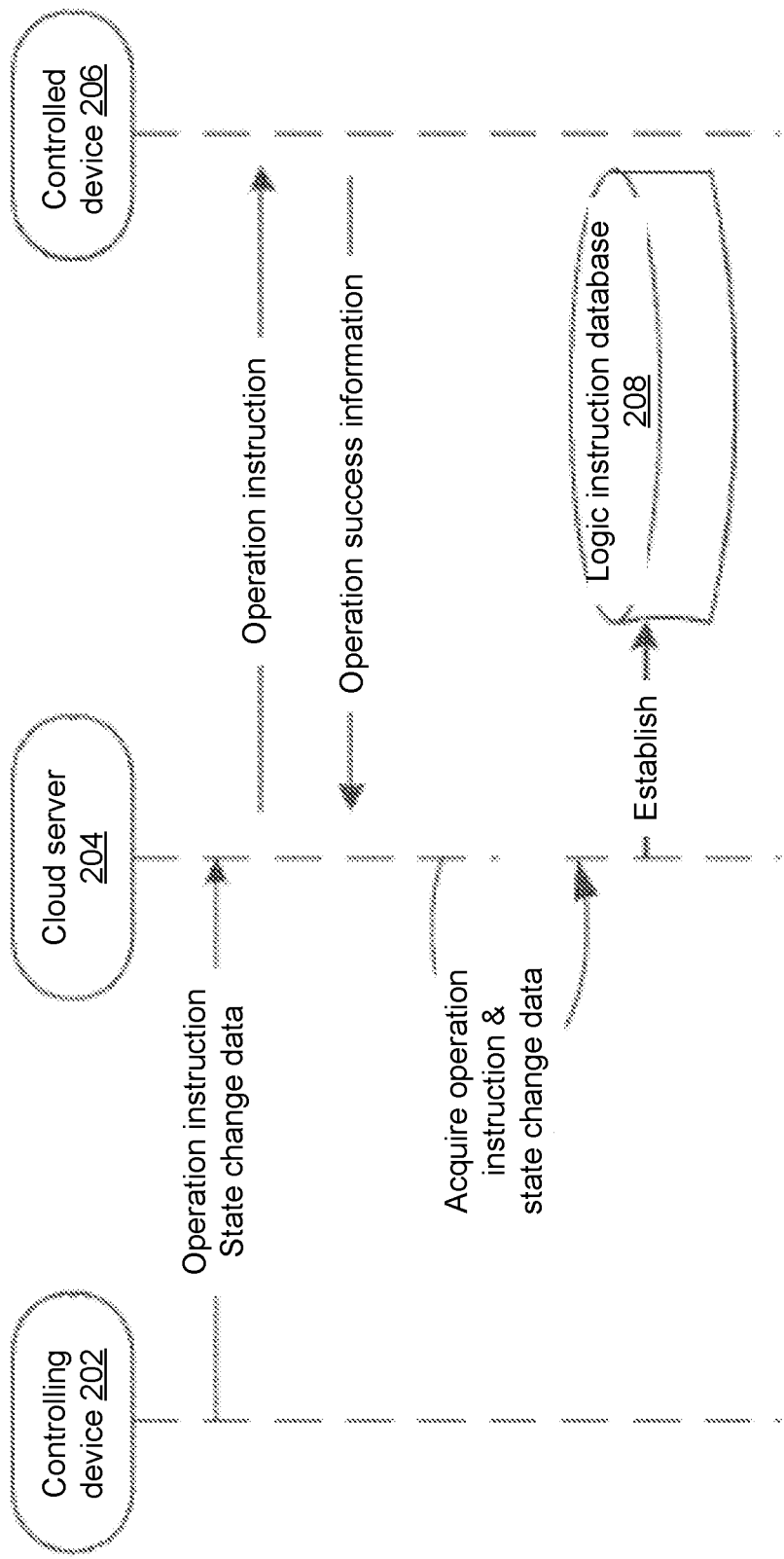
FIG. 2 is a schematic diagram of acquisition of device data by a cloud server according to an example embodiment of the present disclosure.

In this example embodiment of the present disclosure, there are two situations when a cloud server acquires device data in a transmitting process: In one situation, as shown in FIG. 2, a controlling device 202 sends operation instruction and state change data to a cloud server 204. The cloud server sends an operation instruction to a controlled device 206. The controlled device 206 returns operation success information to the cloud server 204. The cloud server 204 acquires the operation instruction and the state change data. The cloud server 204 establishes a log instruction database 208. The device data is acquired when an operation instruction submitted by a controlling device is transmitted to a controlled device, as shown in FIG. 2.

Figure 3:
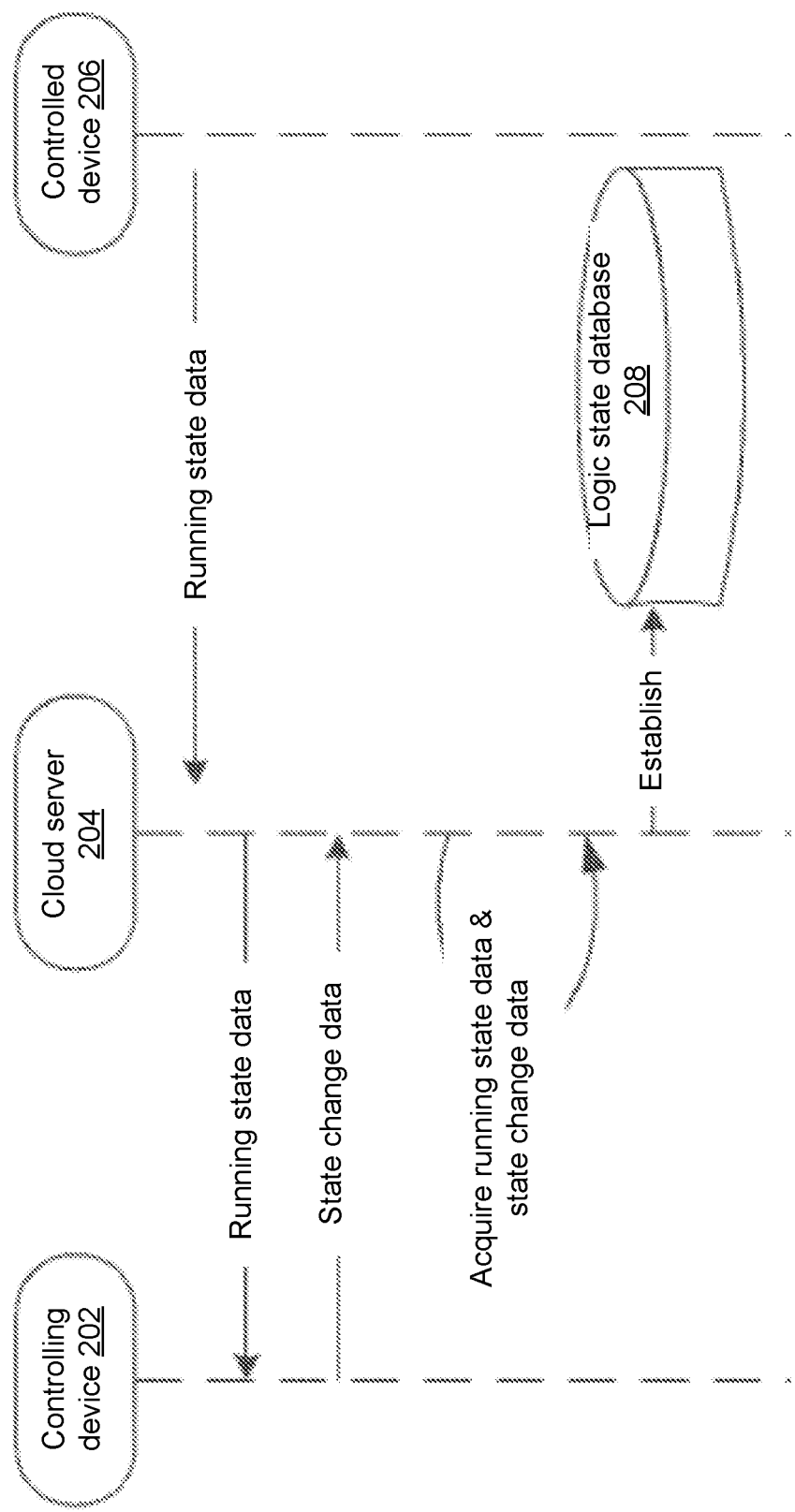
FIG. 3 is another schematic diagram of acquisition of device data by a cloud server according to an example embodiment of the present disclosure.

In the other situation, as shown in FIG. 3, the controlled device 206 sends running state data to the cloud server 204. The cloud server 204 sends the running state data to the controlling device 202. The controlling device 202 sends the state change data to the cloud server 204. The cloud server 204 acquires the running state data and the state change data. The cloud server 204 then establishes the log stat database 208. The device data is acquired when running state data submitted by a controlled device is transmitted to a controlling device, as shown in FIG. 3.

Using an example in which an APP installed on the controlling device controls the on/off state of the controlled device, specific descriptions are given below with reference to example embodiments of the present disclosure.

(1) Device data is acquired when an operation instruction submitted by a controlling device is transmitted to a controlled device.

Figure 4:
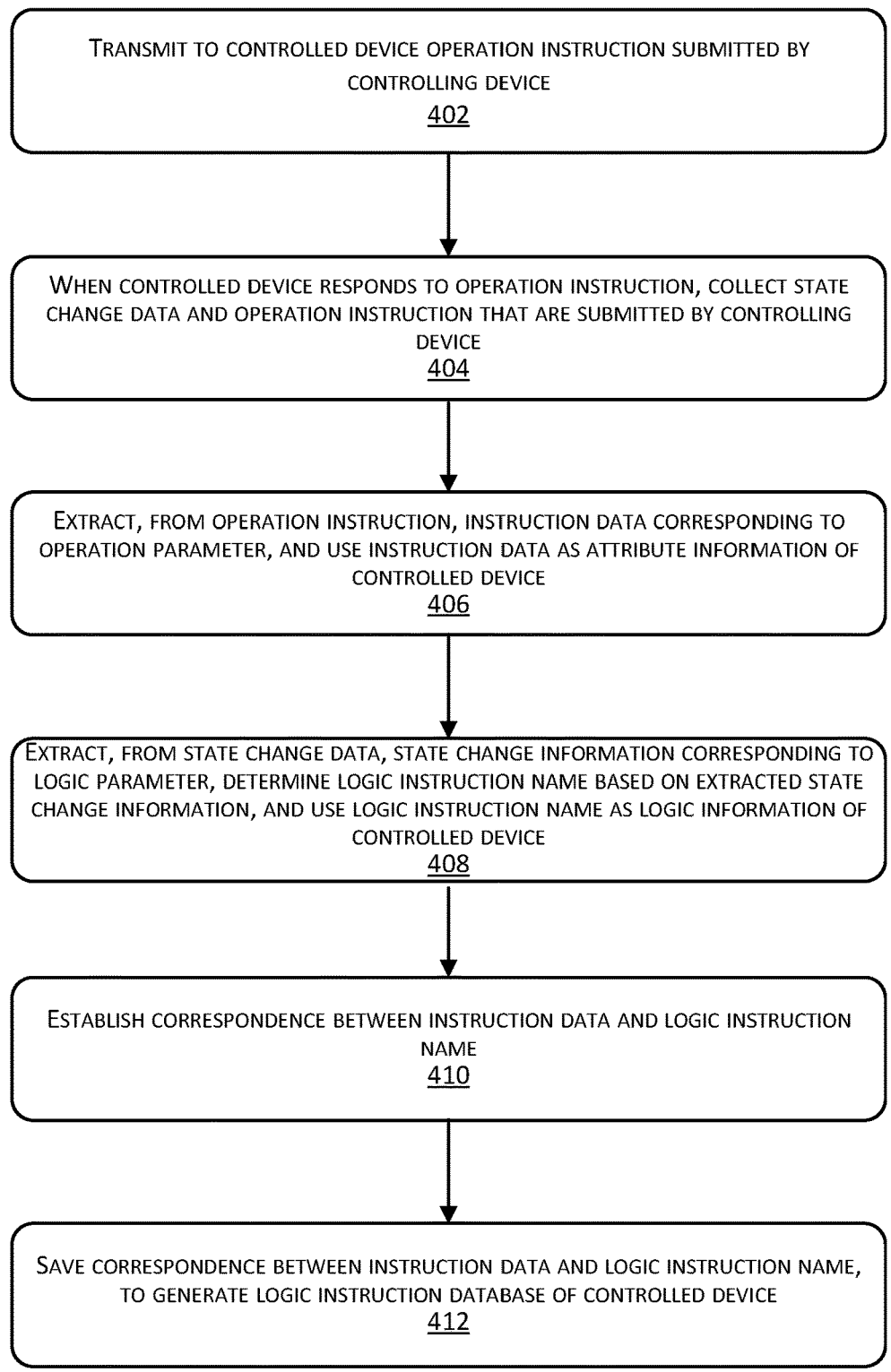
FIG. 4 is a flowchart of steps of a processing method for identification data according to an example embodiment of the present disclosure.

Referring to FIG. 4, FIG. 4 shows a flowchart of steps of a processing method for identification data according to an example embodiment of the present disclosure. The method may include the following steps:

Step 402: An operation instruction submitted by a controlling device is transmitted to a controlled device.

As a specific example of the present invention, a user may operate an APP installed on the controlling device to control the on/off state of the controlled device. For example, the user may turn on or turn off a light by tapping a switch control on the APP. For example, when tapping the switch control of the APP, the user may trigger the APP to submit data to a cloud server, the submitted data including an operation instruction that needs to be submitted, state change data, and so on. The operation instruction is used for controlling the running state of the controlled device, and may include control object data, instruction data and so on. The control object data is used for determining a control object (that is, used for determining the controlled device). The instruction data is used for changing the state of the controlled device. The state change data may also be referred to as user interaction operation information, which refers to interface change information generated based on man-machine interaction, and may include, but not limited to, state label data, state type data, state alteration data, and the like. The state label data and the state type data may be used for determining logic information, for example, determining a logic instruction name or a logic state name. The state alteration data may be used for displaying the state of the controlled device in the controlling device. Upon receiving an operation instruction submitted by the APP, the cloud server determines a controlled device according to control object data in the operation instruction and transmits the operation instruction to the controlled device, such that the controlled device may receive the operation instruction sent by the controlling device, i.e., such that the controlling device may be connected to the controlled device.

For example, On/Off of a light is controlled. Refer to Table 1:

TABLE 1

| Data submitted by APP | Light on | Light off |
|---|---|---|
| Control object | Light A | Light A |
| Device instruction | FF01 | FF00 |
| Control type | Switch | Switch |
| Control label | on | off |
| Controls state | on | off |

When the APP needs to turn on the light A, an operation instruction submitted by the APP is "control object: light A; device instruction: FF01", and the state change data is "control type: switch; control label: on; control state: on". When the APP needs to turn off the light A, an operation instruction submitted by the APP is "control object: light A; device instruction: FF00", and the state change data is "control type: switch; control label: off; control state: off". "Control object: light A" is control object data, and it may be determined that the controlled device is light A. "Device instruction: FF01" and "device instruction: FF00" are instruction data, where "FF01" may be used to turn on light A, and "FF00" may be used to turn off light A. "Control label: on" and "control label: off" are state label data. The controlling device may display the current running state of the controlled device to the user by displaying the state label data. "Control type: switch" is state type data. "Control state: on" and "control state: off" are state change data.

Step 404: When the controlled device responds to the operation instruction, state change data and the operation instruction that are submitted by the controlling device are collected.

After successfully executing the operation instruction sent by the APP, i.e., responding to the operation instruction, the controlled device may report operation success information to the cloud server, for example, submit current running state data to the cloud server. For example, the light A responds to the operation instruction "control object: light A; device instruction: FF01", that is, the light A is in an on state, and may submit current running state data (such as "device object: light A; device data: FF01") to the cloud server. The cloud server transmits the running state data, so that the APP may change the manner in which the switch control of the light A is displayed. For example, the APP displays in green the control for displaying the state of the light A. In this case, the cloud server may collect data from the APP to detect whether the controlled device responds to the operation instruction. For example, upon detecting that the state alteration data submitted by the APP changes, that is, when the control state changes from "on" to "off" or from "off" to "on", it may be determined that the display interface of the APP changes, thus determining that the controlled device responds to the operation instruction and collecting the state change data and the operation instruction submitted by the APP.

Step 406: Instruction data corresponding to an operation parameter is extracted from the operation instruction, and the instruction data is used as attribute information of the controlled device.

The cloud server may preset an operation parameter, and extract, from the collected operation command, instruction data corresponding to the operation parameter. As a specific example of this example embodiment of the present disclosure, the cloud server may set an identifier of the device instruction as the operation parameter, and extract, from the operation instruction, instruction data corresponding to the identifier of the device instruction, for example, "device instruction: FF01" or "device instruction: FF00". After extracting the instruction data, the cloud server may use the extracted instruction data as attribute information of the controlled device, for example, use "FF01" as instruction data for turning on the light A, and use "FF00" as instruction data for turning off the light A.

Step 408: State change information corresponding to a logic parameter is extracted from the state change data, a logic instruction name is determined based on the extracted state change information, and the logic instruction name is used as logic information of the controlled device.

The cloud server may further preset a logic parameter, and extract, from the collected state change data, state change information corresponding to the logic parameter. As a specific example of this example embodiment of the present disclosure, the cloud server may set an identifier of the control type, an identifier of the control state, and an identifier of the control label as logic parameters, and extract, from the state change data, information corresponding to the identifiers, that is, extract state type data (such as "control type: switch") corresponding to the identifier of the control type, state alteration data (such as "control state: on") corresponding to the identifier of the control state, and state label data (such as "control label: on") corresponding to the identifier of the control label. After extracting the state change information, the cloud server may parse the extracted state change information to determine a logic instruction name, and use the determined logic instruction name as logic information of the controlled device. For example, the cloud server parses the state type data "control type: switch" and the state label data "control label: on" to determine that the logic instruction name is "turn on", and parses the state type data "control type: switch" and the state label data "control label: off" to determine that the logic instruction name is "turn off".

Step 410: A correspondence between the instruction data and the logic instruction name is established.

After determining the instruction data and the logic instruction name corresponding to the device data, the cloud server may establish a correspondence between the instruction data and the logic instruction name. For example, the cloud server establishes a correspondence between the instruction data "FF01" for turning on the light A and the logic instruction name "turn on". That is, for the light A, the logic instruction name corresponding to the instruction data "FF01" is "turn on". The cloud server establishes a correspondence between the instruction data "FF00" for turning off the light A and the logic instruction name "turn off". That is, for the light A, the logic instruction name corresponding to the instruction data "FF00" is "turn off". Apparently, the cloud server may collect data submitted by the APP, and complete identification of the instruction data of the controlled device according to the state change data submitted by the APP, i.e., complete identification of device private data.

Step 412. The correspondence between the instruction data and the logic instruction name is saved, to generate a logic instruction database of the controlled device.

The cloud server may save the correspondence between the instruction data and the logic instruction name, to generate a logic instruction database of the controlled device. For example, the could may save the instruction data of the controlled device, the logic instruction name corresponding to the instruction data, as well as the correspondence between the instruction data and the logic instruction name, to generate the logic instruction database of the controlled device.

When the controlled device cannot respond to an operation instruction submitted by a controlling device N, the cloud server may extract state change information from state change data submitted by the controlling device N and parse the state change information, to determine a logic instruction name corresponding to the operation instruction submitted by the controlling device N. Then, according to the determined logic instruction name, the cloud server may extract instruction data corresponding to the logic instruction name from the logic instruction database of the controlled device, and send the extracted instruction data to the controlled device, such that the controlling device N may control the controlled device.

In this example embodiment of the present disclosure, when the controlled device responds to an operation command of the controlling device, the cloud server collects data submitted by the controlling device, i.e., collects device data; extracts, from the device data, a logic instruction name and instruction data corresponding to the operation command; and establishes a logic instruction database of the controlled device, to complete identification of the operation instruction, thus implementing interoperation of IoT data based on the logic instruction database and improving the use value of the IoT.

(2) Device data is acquired when running state data submitted by a controlled device is transmitted to a controlling device.

Figure 5:
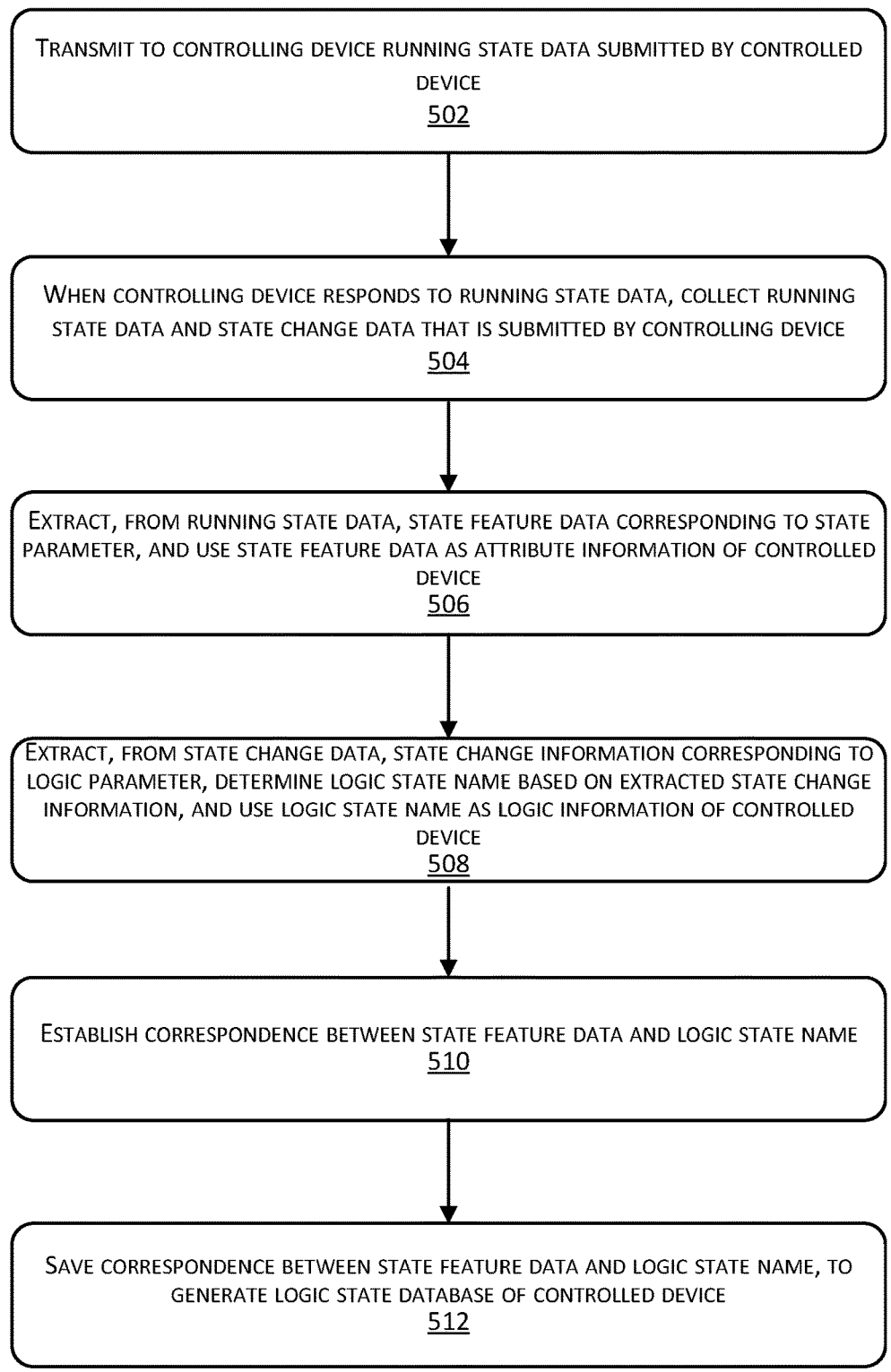
FIG. 5 is a flowchart of steps of another processing method for identification data according to an example embodiment of the present disclosure.

Referring to FIG. 5, FIG. 5 shows a flowchart of steps of another processing method for identification data according to an example embodiment of the present disclosure. The method may include the following steps:

Step 502: Running state data submitted by a controlled device is transmitted to a controlling device.

In specific implementation, the controlled device may also submit data corresponding to its current running state, i.e., the running state data, to a cloud server, such that the controlling device may acquire the running state data currently corresponding to the controlled device. After receiving the running state data submitted by the controlled device, the cloud server transmits the running state data to the controlling device, such that the controlling device changes a display interface. Certainly, the controlled device may also submit controlling device data, such that the cloud server may determine a controlling device according to the controlling device data.

For example, a light A submits data to the cloud server based on a current running state. Refer to Table 2:

TABLE 2

| Data submitted by light A | On state | Off state |
|---|---|---|
| Controlling device | APP | APP |
| Device state | FE01 | FE00 |

When the light A successfully executes instruction data "FF01", that is, when the light A is in an on state, the light A submits running state information "device state: FE01" corresponding to the on state and controlling device data "controlling device: APP". When the light A successfully executes instruction data "FF00", that is, when the light A is in an off state, the light A submits running state information "device state: FE00" corresponding to the off state and controlling device data "controlling device: APP".

Certainly, it is also possible that the controlled device does not submit the controlling device data. In this case, the cloud server may determine a controlling device corresponding to the controlled device according to a historical transmit record, and transmit to the determined controlling device the running state data submitted by the controlled device.

Step 504: When the controlling device responds to the running state data, the running state data and state change data that is submitted by the controlling device are collected.

After successfully executing the operation instruction sent by the APP, i.e., after responding to the operation instruction, the controlled device may report operation success information to the cloud server, for example, submit current running state data to the cloud server. For example, the light A responds to an operation instruction "control object: light A; device instruction: FF01", that is, the light A is in an on state, and may submit current running state data (such as "device object: light A; device data: FF01") to the cloud server. The cloud server transmits the running state data, so that the APP may change the manner in which a switch control of the light A is displayed. For example, the APP displays in green the control for displaying the state of the light A. In this case, the cloud server may collect data from the APP to detect whether the controlling device responds to the operation instruction. For example, upon detecting that the state alteration data submitted by the APP changes, that is, when the control state changes from "on" to "off" or the control state changes from "off" to "on", it may be determined that the display interface of the APP changes, thus determining that the APP of the controlling device may respond to the running state data submitted by the light A, i.e., determining that the controlling device may respond to the running state data submitted by the controlled device. In this case, the cloud server may collect the state change data submitted by the controlling device and the running state data submitted by the controlled device, for example, collect the data submitted by the APP and the data submitted by the light A, and process the collected data, to generate a logic state database of the controlled device.

Step 506: State feature data corresponding to a state parameter is extracted from the running state data, and the state feature data is used as attribute information of the controlled device.

For example, the cloud server may preset a state parameter, and extract, from the collected running state data, state feature data corresponding to the state parameter. As a specific example of this example embodiment of the present disclosure, the cloud server may set an identifier of a device state as the state parameter, and extract, from the running state data, state feature data corresponding to the identifier of the device state, for example, "device state: FE01", "device state: FE01", or the like. After extracting the state feature data, the cloud server may use the extracted state feature data as the attribute information of the controlled device, for example, use "FE01" as state feature data corresponding to the on state of the light A, and use "FE00" as state feature data corresponding to the off state of the light A.

In addition, the cloud server may further determine a feature value by comparing the state feature data corresponding to the two states. The feature value is consistent with the format of device private data, and may be used for determining a state value corresponding to the state feature data. For example, by comparing the state feature data "FE00" corresponding to the off state of the light A and the state feature data "FE01" corresponding to an initial state of the light A, the cloud server may determine a feature value "0001" corresponding to the on state of the light A, and only the part indicating the change is distinguished with "1". In the subsequent data processing, the cloud may use the feature value to acquire a state value corresponding to a current logic state of the device, that is, the cloud may determine state values corresponding to respective state feature data according to the feature value. As a specific example of the present disclosure, a preset meaning corresponding to a state value of 1 is "on state", and a preset meaning corresponding to a state value of 0 is "off state". If a state value corresponding to the state feature data of the controlled device is 1, for example, it is determined that the state value corresponding to the state feature data FE01 is 1 by calculating a logic value of FE01&0001, it may be determined that the controlled device is currently in the on state. If a state value corresponding to the state feature data of the controlled device is 0, for example, it is determined that the state value corresponding to the state feature data FE00 is 0 by calculating a logic value of FE00&0001, it may be determined that the controlled device is currently in the off state.

Step 508: State change information corresponding to a logic parameter is extracted from the state change data, a logic state name is determined based on the extracted state change information, and the logic state name is used as logic information of the controlled device.

The cloud server may further preset a logic parameter, and extract, from the collected state change data, state change information corresponding to the logic parameter. After extracting the state change information, the cloud server may parse the extracted state change information to determine a logic state name, and use the determined logic state name as logic information of the controlled device. For example, the cloud server parses the state type data "control type: switch" and the state label data "control label: on" to determine that the logic state name is "on state", and parses the state type data "control type: switch" and the state label data "control label: off" to determine that the logic state name is "off state".

Step 510: A correspondence between the state feature data and the logic state name is established.

After determining the state feature data and the logic state name corresponding to the device data, the cloud server may establish a correspondence between the state feature data and the logic state name. For example, the cloud server establishes a correspondence between state feature data "FE01" corresponding to the on state of the light A and the logic state name "on state". That is, for the light A, the logic state name corresponding to the state feature data "FE01" is "on state". The cloud server establishes a correspondence between state feature data "FE00" corresponding to the off state of the light A and the logic state name "off state". That is, for the light A, the logic state name corresponding to the state feature data "FE01" is "on state". Apparently, the cloud server may collect the state change data submitted by the APP, and interpret data meanings from the running state data submitted by the controlled device, i.e., complete identification of the running state data of the controlled device according to the state change data.

Step 512: The correspondence between the state feature data and the logic state name is saved, to generate a logic state database of the controlled device.

The cloud server may save the correspondence between the state feature data and the logic state name, to generate a logic state database of the controlled device. For example, the cloud may save the state data of the controlled device, the logic state name corresponding to the state feature data, as well as the correspondence between the state feature data and the logic state name, to generate the logic state database of the controlled device. Certainly, the cloud server may also save the feature value of the controlling device into the logic state database.

When the controlled device uploads running state data of its current state again, the cloud server may determine a running state corresponding to the running state data according to the established logic state database, thus identifying the running state data submitted by the controlled device. For example, the cloud server may extract state feature data from the running state data, search the logic state database of the controlled device according to the state feature data, and extract the logic state name corresponding to the state feature data from the logic state database, thus determining the current state of the controlled device.

When a controlling device N cannot respond to the running state data submitted by the controlled device, the cloud server may determine, based on the logic state database of the controlled device, the logic state name corresponding to the running state data submitted by the controlled device, and search a logic state database of the controlling device according to the logic state name, thus extracting state feature data of the controlling device N corresponding to the logic state name. Then, the cloud server sends the state feature data of the controlling device N to the controlling device N, such that the controlling device N may change the display interface, to display the current running state of the controlled device. As such, the controlling device N may respond to the running state data submitted by the controlled device, thus implementing interoperation of IoT data.

Certainly, the cloud server may also determine the current state of the controlled device in other manners. For example, the cloud server may determine a state value corresponding to the state feature data according to a feature value of the controlled device, and then may determine the current state of the controlled device according to a preset meaning corresponding to the state. The determining manner is not limited in this example embodiment of the present disclosure.

In this example embodiment of the present disclosure, when the controlling device responds to the running state data of the controlled device, the cloud server collects the state change data submitted by the controlling device and the running state data submitted by the controlled device; extracts, from the state change data, a logic state name corresponding to the running state data and extracts state feature data from the running state data; and establishes a logic state database of the controlled device, to complete identification of the running state data, thus implementing interoperation of IoT data based on the logic state database and improving the use value of the IoT.

In an example embodiment of the present disclosure, the method further includes: when the controlled device cannot identify device data of the controlling device, mapping the device data of the controlling device according to the logic database, to obtain corresponding converted data; and sending the converted data to the controlled device.

In the process of transmitting the device data submitted by the controlling device, if the cloud server receives an operation failure message reported by the controlled device or cannot receive an operation success message reported by the controlled device in a preset response time, the cloud server determines that the controlled device cannot identify the device data sent by the controlling device. For example, when the controlled device cannot execute the instruction data sent by the controlling device, i.e., when the operation instruction sent by the controlling device cannot control the controlled device directly, the cloud server may convert the instruction data sent by the controlling device according to the established logic instruction database, to obtain converted instruction data. For example, the cloud server may determine the logic instruction name corresponding to the operation instruction according to the state change data in the device data submitted by the controlling device, extract the instruction data corresponding to the logic instruction name from the established logic database of the controlled device, and replace the instruction data in the operation instruction with the extracted instruction data, to obtain a converted operation instruction, i.e., obtain the corresponding converted data. Then the cloud server sends the converted data to the controlled device. After receiving the converted data, the controlled device may execute the instruction data in the converted data, i.e., respond to the converted operation instruction, such that the controlling device may control the controlled device.

In addition, when the controlling device cannot identify the running state data submitted by the controlled device, the cloud server may determine a logic state name corresponding to the state feature data in the running state data according to the logic state database of the controlled device. Moreover, the cloud server may also obtain state type data and state change data corresponding to the logic state name according to the logic state database in the controlling device, i.e., obtain converted state data, and send the converted state data to the controlling device, such that the controlling device may display the current running state of the controlled device according to the converted state data.

In this example embodiment, when the controlling device cannot identify the device data of the controlled device or when the controlled device cannot identify the device data of the controlling device, the cloud server may convert the received device data based on the established logic database of the controlling device and/or the established logic database of the controlled device, i.e., map the device data according to the logic database, to obtain corresponding converted data, and send the converted data to the controlled device and/or the controlling device, such that the controlling device may control the controlled device, thus implementing interoperation of IoT data.

It should be noted that for ease of description, the method example embodiments mentioned above are all described as a series of action combinations. However, those skilled in the art should know that the example embodiments of the present disclosure are not limited to the action order described here, because some steps may be performed in other orders or simultaneously according to the example embodiments of the present disclosure. Secondly, those skilled in the art should also know that the example embodiments described in the specification are all example embodiments, and involved actions are not mandatory for the example embodiments of the present disclosure.

Example Embodiment 3

Figure 6:
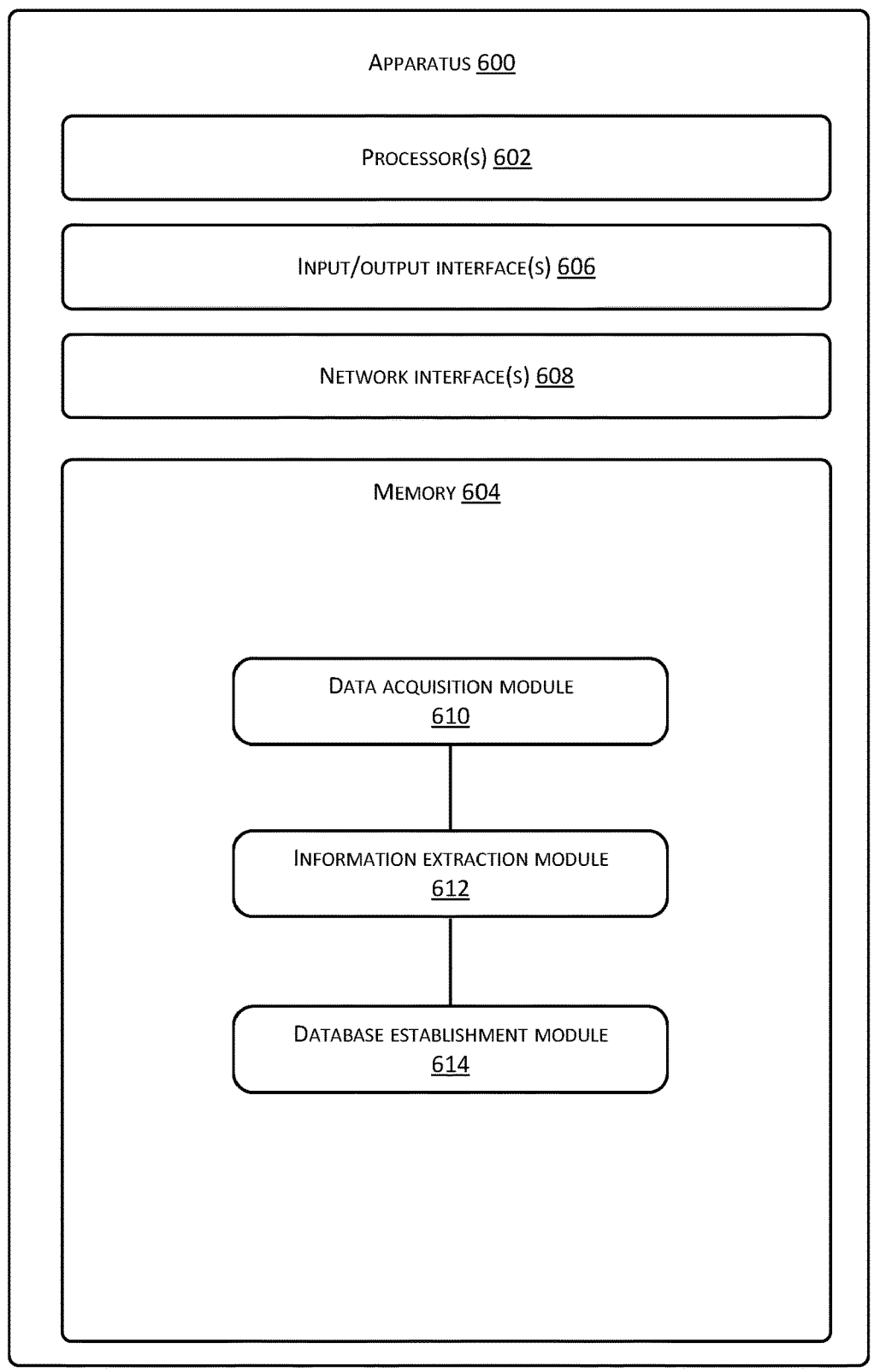
FIG. 6 is a structural block diagram of a processing apparatus for identification data according to an example embodiment of the present disclosure.

Referring to FIG. 6, FIG. 6 shows a structural block diagram of a processing apparatus for identification data according to the present disclosure. In FIG. 6, an apparatus 600 includes one or more processor(s) 602 or data processing unit(s) and memory 604. The apparatus 600 may further include one or more input/output interface(s) 606 and one or more network interface(s) 608. The memory 604 is an example of computer readable media.

The memory 604 may store therein a plurality of modules or units including:
- a data acquisition module 610 configured to acquire device data based on an interaction between a controlling device and a controlled device, wherein the device data is related to a state of the controlled device;
- an information extraction module 612 configured to extract logic information and attribute information according to the device data; and
- a database establishment module 614 configured to establish a logic database of the controlled device, wherein the logic database includes a correspondence between the attribute information and the logic information.

In this example embodiment of the present disclosure, the cloud server may acquire device data based on an interaction between the controlling device and the controlled device, and extract logic information and attribute information according to the device data. That is, a logic database of the device is established by using data meanings interpreted by the controlling device from the device private data, thus implementing interoperation of IoT data and improving the use value of the IoT.

Figure 7:
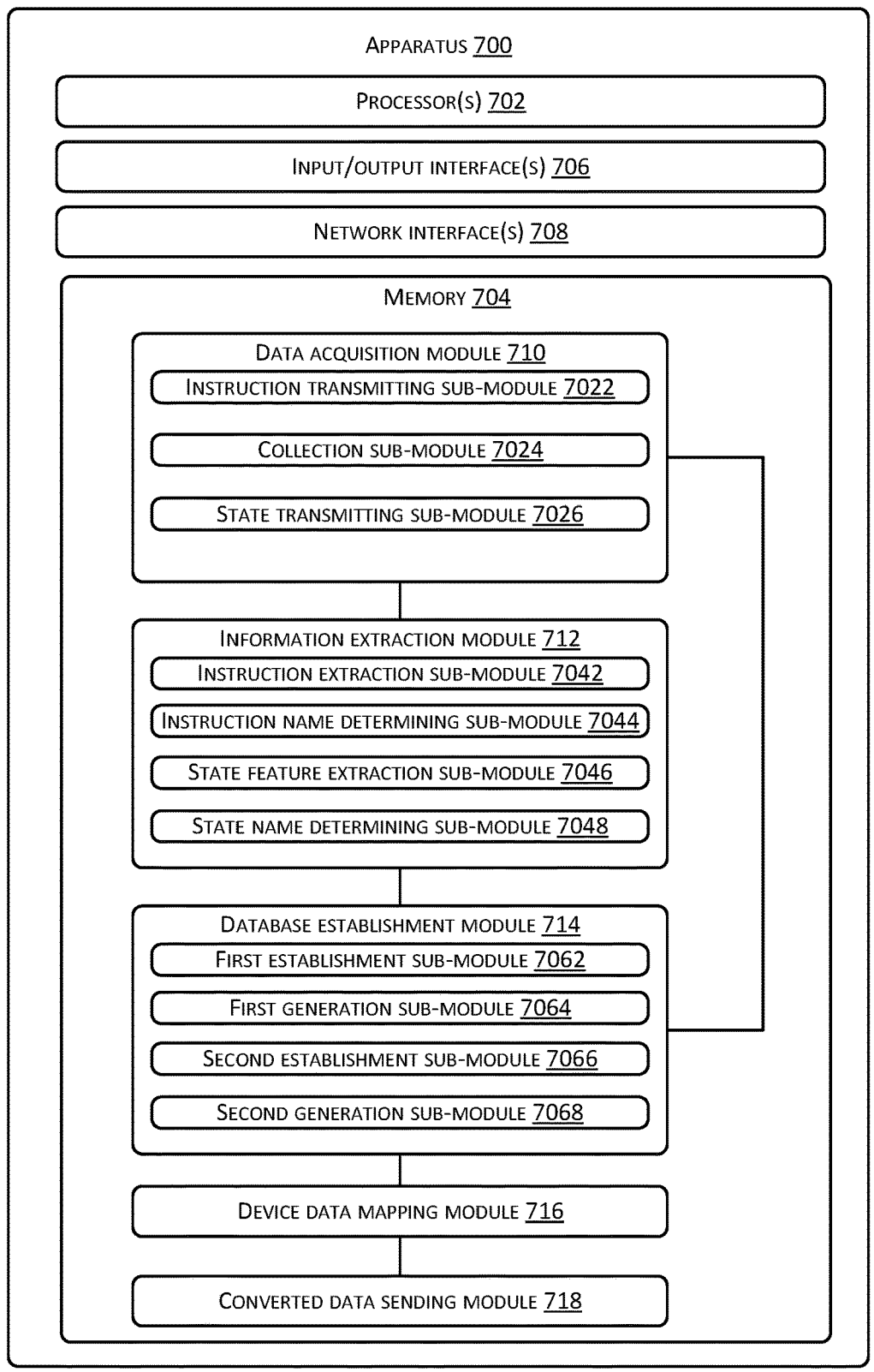
FIG. 7 is a structural block diagram of another processing apparatus for identification data according to an example embodiment of the present disclosure.

Referring to FIG. 7, FIG. 7 shows a structural block diagram of another processing apparatus for identification data according to the present disclosure.

In FIG. 7, an apparatus 700 includes one or more processor(s) 702 or data processing unit(s) and memory 704. The apparatus 700 may further include one or more input/output interface(s) 706 and one or more network interface(s) 708. The memory 704 is an example of computer readable media.

The memory 704 may store therein a plurality of modules or units including a data acquisition module 710, an information extraction module 712, a database establishment module 714, a device data mapping module 716, and a converted data sending module 718.

The data acquisition module 710 may be configured to acquire device data according to interaction data when the interaction data is transmitted between a controlling device and a controlled device, wherein the device data is related to a state of the controlled device.

In an example embodiment of the present disclosure, the data acquisition module 710 may include the following sub-modules:
- an instruction transmitting sub-module 7022 configured to transmit to the controlled device an operation instruction submitted by the controlling device; and
- a collection sub-module 7024 configured to collect state change data and the operation instruction that are submitted by the controlling device, when the controlled device responds to the operation instruction.

For example, the data acquisition module 710 may further include a state transmitting sub-module 7026.

The state transmitting sub-module 7026 may be configured to configured to transmit to the controlling device running state data submitted by the controlled device. Correspondingly, the collection sub-module 7024 may be further configured to collect the running state data and state change data that is submitted by the controlling device, when the controlling device responds to the running state data.

The information extraction module 712 may be configured to extract logic information and attribute information according to the device data.

In an example embodiment of the present disclosure, the information extraction module 712 may include the following sub-modules:

an instruction extraction sub-module 7042 configured to extract, from the operation instruction, instruction data corresponding to an operation parameter, and use the instruction data as the attribute information of the controlled device;

an instruction name determining sub-module 7044 configured to extract, from the state change data, state change information corresponding to a logic parameter, determine a logic instruction name based on the extracted state change information, and use the logic instruction name as the logic information of the controlled device;

a state feature extraction sub-module 7046 configured to extract, from the running state data, state feature data corresponding to a state parameter, and use the state feature data as the attribute information of the controlled device; and a state name determining sub-module 7048 configured to extract, from the state change data, state change information corresponding to a logic parameter, determine a logic state name based on the extracted state change information, and use the logic state name as the logic information of the controlled device.

The database establishment module 714 may be configured to establish a logic database of the controlled device, wherein the logic database includes a correspondence between the attribute information and the logic information.

In an example implementation of the present invention, the database establishment module 714 may include the following sub-modules:

a first establishment sub-module 7062 configured to establish a correspondence between the instruction data and the logic instruction name;

a first generation sub-module 7064 configured to save the correspondence between the instruction data and the logic instruction name, to generate a logic instruction database of the controlled device;

a second establishment sub-module 7066 configured to establish a correspondence between the state feature data and the logic state name; and a second generation sub-module 7068 configured to save the correspondence between the state feature data and the logic state name, to generate a logic instruction database of the controlled device.

In an example embodiment of the present disclosure, the state change data may include data extracted according to a change in a display interface of the controlling device.

For example, the state change data may include: state label data, state type data, state alteration data, and the like, wherein the state label data and the state type data are used for determining the logic instruction name or the logic state name; and the state alteration data is used for displaying the state of the controlled device in the controlling device.

The device data mapping module 716 may be configured to: when the controlled device cannot identify device data of the controlling device, map the device data of the controlling device according to the logic database, to obtain corresponding converted data.

The converted data sending module 718 may be configured to send the converted data to the controlled device.

The apparatus example embodiment is basically similar to the method example embodiment, so it is described simply. For related parts, reference may be made to the descriptions of the parts in the method example embodiment.

The example embodiments in the specification are described progressively, each example embodiment emphasizes a part different from other example embodiments, and identical or similar parts of the example embodiments may be obtained with reference to each other.

Those skilled in the art should understand that the example embodiments of the present disclosure may be provided as a method, an apparatus, or a computer program product. Therefore, the example embodiments of present disclosure may be implemented as an entirely hardware example embodiment, an entirely software example embodiment, or an example embodiment combining software and hardware. Moreover, the example embodiments of the present disclosure may be in the form of a computer program product implemented on one or more computer usable storage media (including, but not limited to, a magnetic disk memory, a CD-ROM, an optical memory and the like) including computer usable program codes.

In a typical configuration, the computer device includes one or more central processing units (CPUs), an input/output interface, a network interface, and a memory. The memory may include computer readable media such as a volatile memory, a Random Access Memory (RAM), and/or non-volatile memory, e.g., a Read-Only Memory (ROM) or a flash RAM. The memory is an example of a computer readable medium. The computer readable medium includes non-volatile and volatile media as well as movable and non-movable media, and may implement information storage by means of any method or technology. Information may be a computer readable instruction, a data structure, and a module of a program or other data. Examples of the storage medium of a computer include, but are not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in this text, the computer readable medium does not include transitory media, such as a modulated data signal and a carrier.

The example embodiments of the present disclosure are described with reference to flowcharts and/or block diagrams of the method, terminal device (system) and computer program product according to the example embodiments of the present disclosure. It should be understood that a computer program instruction may be used to implement each process and/or block in the flowcharts and/or block diagrams and combinations of processes and/or blocks in the flowcharts and/or block diagrams. These computer program instructions may be provided to a general-purpose computer, a special-purpose computer, an embedded processor, or a processor of any other programmable data processing terminal device to generate a machine, so that the instructions executed by a computer or a processor of any other programmable data processing terminal device generate an apparatus for implementing a specified function in one or more processes in the flowcharts and/or in one or more blocks in the block diagrams.

These computer program instructions may also be stored in a computer readable memory that may instruct a computer or any other programmable data processing device to work in a particular manner, such that the instructions stored in the computer readable memory generate an article of manufacture that includes an instruction apparatus. The instruction apparatus implements a function specified in one or more processes in the flowcharts and/or in one or more blocks in the block diagrams.

These computer program instructions may also be loaded onto a computer or another programmable data processing terminal device, such that a series of operation steps are performed on the computer or another programmable terminal device, thus generating computer-implemented processing. Therefore, the instructions executed on the computer or another programmable terminal device provide steps for implementing functions specified in one or more processes in the flowcharts and/or in one or more blocks in the block diagrams.

Although example embodiments of the example embodiments of the present disclosure have been described, those skilled in the art may make additional changes and modifications to these example embodiments once they know the basic inventive concept. Therefore, the appended claims are intended to be construed as including the example embodiments and all changes and modifications falling in the scope of the example embodiments of the present disclosure.

Finally, it should be further noted that in this text, the relational terms such as "first" and "second" are merely used to distinguish one entity or operation from another entity or operation, but do not necessarily require or imply any such actual relationship or sequence between these entities or operations. Moreover, the terms "include", "comprise" or their other variations are intended to cover non-exclusive inclusion, so that a process, a method, an article or a terminal device including a series of elements not only includes the elements, but also includes other elements not clearly listed, or further includes inherent elements of the process, method, article or terminal device. In the absence of more limitations, an element defined by "including a/an . . . " does not exclude that the process, method, article or terminal device including the element further has other identical elements.

A processing method and apparatus for identification data provided in the present disclosure are described in detail above. Specific examples are used in this text to illustrate the principle and implementations of the present disclosure. The foregoing description of the example embodiments is merely used to help understand the method of the present disclosure and its core idea. Meanwhile, those of ordinary skill in the art may make changes to the specific implementations and application scope according to the idea of the present disclosure. In conclusion, the content of the specification should not be construed as a limitation to the present disclosure.

The present disclosure may further be understood with clauses as follows.

Clause 1. A processing method for identification data, comprising:
  acquiring device data based on an interaction between a controlling device and a controlled device, wherein the device data is related to a state of the controlled device;
  extracting logic information and attribute information according to the device data; and
  establishing a logic database of the controlled device, wherein the logic database comprises a correspondence between the attribute information and the logic information.

Clause 2. The method of clause 1, wherein the step of acquiring device data based on an interaction between a controlling device and a controlled device comprises:
  acquiring the device data according to interaction data when the interaction data is transmitted between the controlling device and the controlled device.

Clause 3. The method of clause 2, wherein the step of acquiring the device data according to interaction data when the interaction data is transmitted between the controlling device and the controlled device comprises:
  transmitting to the controlled device an operation instruction submitted by the controlling device; and
  collecting state change data and the operation instruction that are submitted by the controlling device, when the controlled device responds to the operation instruction.

Clause 4. The method of clause 3, wherein the step of extracting logic information and attribute information according to the device data comprises:
  extracting, from the operation instruction, instruction data corresponding to an operation parameter, and using the instruction data as the attribute information of the controlled device; and
  extracting, from the state change data, state change information corresponding to a logic parameter, determining a logic instruction name based on the extracted state change information, and using the logic instruction name as the logic information of the controlled device.

Clause 5. The method of clause 4, wherein the step of establishing a logic database of the controlled device comprises:
  establishing a correspondence between the instruction data and the logic instruction name; and
  saving the correspondence between the instruction data and the logic instruction name, to generate a logic instruction database of the controlled device.

Clause 6. The method of clause 2, wherein the step of acquiring the device data according to interaction data when the interaction data is transmitted between the controlling device and the controlled device comprises:
  transmitting to the controlling device running state data submitted by the controlled device; and
  collecting the running state data and state change data that is submitted by the controlling device, when the controlling device responds to the running state data.

Clause 7. The method of clause 6, wherein the step of extracting logic information and attribute information according to the device data comprises:
  extracting, from the running state data, state feature data corresponding to a state parameter, and using the state feature data as the attribute information of the controlled device; and
  extracting, from the state change data, state change information corresponding to a logic parameter, determining a logic state name based on the extracted state change information, and using the logic state name as the logic information of the controlled device.

Clause 8. The method of clause 7, wherein the step of establishing a logic database of the controlled device comprises:
    establishing a correspondence between the state feature data and the logic state name; and
    saving the correspondence between the state feature data and the logic state name, to generate a logic state database of the controlled device.

Clause 9. The method of any of clauses 3 to 8, wherein the state change data comprises data extracted according to a change in a display interface of the controlling device.

Clause 10. The method of any of clauses 3 to 8, wherein the state change data comprises: state label data, state type data and state alteration data, wherein the state label data and the state type data are used for determining the logic instruction name or the logic state name, and the state alteration data is used for displaying the state of the controlled device in the controlling device.

Clause 11. The method of clause 2, further comprising:
    when the controlled device cannot identify device data of the controlling device, mapping the device data of the controlling device according to the logic database, to obtain corresponding converted data; and
    sending the converted data to the controlled device.

Clause 12. A processing apparatus for identification data, comprising:
    a data acquisition module configured to acquire device data based on an interaction between a controlling device and a controlled device, wherein the device data is related to a state of the controlled device;
    an information extraction module configured to extract logic information and attribute information according to the device data; and
    a database establishment module configured to establish a logic database of the controlled device, wherein the logic database comprises a correspondence between the attribute information and the logic information.

Clause 13. The apparatus of clause 12, wherein the data acquisition module is specifically configured to acquire the device data according to interaction data when the interaction data is transmitted between the controlling device and the controlled device.

Clause 14. The apparatus of clause 13, wherein the data acquisition module comprises:
    an instruction transmitting sub-module configured to transmit to the controlled device an operation instruction submitted by the controlling device; and
    a collection sub-module configured to collect state change data and the operation instruction that are submitted by the controlling device, when the controlled device responds to the operation instruction.

Clause 15. The apparatus of clause 14, wherein the information extraction module comprises:
    an instruction extraction sub-module configured to extract, from the operation instruction, instruction data corresponding to an operation parameter, and use the instruction data as the attribute information of the controlled device; and
    an instruction name determining sub-module configured to extract, from the state change data, state change information corresponding to a logic parameter, and use a logic instruction name based on the extracted state change information as the logic information of the controlled device.

Clause 16. The apparatus of clause 15, wherein the database establishment module comprises:
    a first establishment sub-module configured to establish a correspondence between the instruction data and the logic instruction name; and
    a first generation sub-module configured to save the correspondence between the instruction data and the logic instruction name, to generate a logic instruction database of the controlled device.

Clause 17. The apparatus of clause 13, wherein the data acquisition module comprises:
    a state transmitting sub-module configured to transmit to the controlling device running state data submitted by the controlled device; and
    a collection sub-module configured to collect the running state data and state change data that is submitted by the controlling device, when the controlling device responds to the running state data.

Clause 18. The apparatus of clause 17, wherein the information extraction module comprises:
    a state feature extraction sub-module configured to extract, from the running state data, state feature data corresponding to a state parameter, and use the state feature data as the attribute information of the controlled device; and
    a state name determining sub-module configured to extract, from the state change data, state change information corresponding to a logic parameter, determine a logic state name based on the extracted state change information, and use the logic state name as the logic information of the controlled device.

Clause 19. The apparatus of clause 18, wherein the database establishment module comprises:
    a second establishment sub-module configured to establish a correspondence between the state feature data and the logic state name; and
    a second generation sub-module configured to save the correspondence between the state feature data and the logic state name, to generate a logic state database of the controlled device.

Clause 20. The apparatus of any of clauses 14 to 19, wherein the state change data comprises data extracted according to a change in a display interface of the controlling device.

Clause 21. The apparatus of any of clauses 14 to 19, wherein the state change data comprises: state label data, state type data and state alteration data, wherein the state label data and the state type data are used for determining the logic instruction name or the logic state name, and the state alteration data is used for displaying the state of the controlled device in the controlling device.

Clause 22. The apparatus of clause 13, further comprising:
    a device data mapping module configured to: when the controlled device cannot identify device data of the controlling device, map the device data of the controlling device according to the logic database, to obtain corresponding converted data; and
    a converted data sending module configured to send the converted data to the controlled device.

What is claimed is:

1. A method comprising:
    acquiring device data based on an interaction that a state of a controlled device changes corresponding to an operation instruction of a controlling device, the device data being related to the state of the controlled device;
    extracting, from the operation instruction of the controlling device, instruction data corresponding to an operation parameter;

using the instruction data as attribute information of the controlled device;

extracting, from state change data of the controlled device, state change information corresponding to a logic parameter;

determining a logic instruction name based on the extracted state change information;

using the logic instruction name as logic information of the controlled device; and establishing a logic database of the controlled device, the logic database including a correspondence between the attribute information and the logic information.

2. The method of claim 1, wherein the acquiring the device data based on the interaction includes:

determining that interaction data is transmitted between the controlling device and the controlled device; and acquiring the device data according to the interaction data.

3. The method of claim 2, wherein the acquiring the device data according to the interaction data includes:

transmitting to the controlled device the operation instruction submitted by the controlling device;

determining that the controlled device responds to the operation instruction; and collecting the state change data and the operation instruction that are submitted by the controlling device.

4. The method of claim 2, wherein the acquiring the device data according to the interaction data includes:

transmitting to the controlling device running state data submitted by the controlled device;

determining that the controlling device responds to the running state data; and collecting the running state data and the state change data that is submitted by the controlling device.

5. The method of claim 4, wherein the using the instruction data as the attribute information of the controlled device includes:

extracting, from the running state data, state feature data corresponding to a state parameter; and using the state feature data as the attribute information of the controlled device.

6. The method of claim 4, wherein the using the logic instruction name as logic information of the controlled device includes:

extracting, from the state change data, state change information corresponding to the logic parameter;

determining a logic state name based on the extracted state change information; and using the logic state name as the logic information of the controlled device.

7. The method of claim 6, wherein the state change data includes:

state label data; or state type data, wherein the state label data or the state type data is used for determining the logic instruction name or the logic state name.

8. The method of claim 7, wherein the state change data includes state alteration data that is used for displaying the state of the controlled device in the controlling device.

9. The method of claim 4, wherein the establishing the logic database of the controlled device includes:

establishing a correspondence between the state feature data and the logic state name; and saving the correspondence between the state feature data and the logic state name to generate a logic state database of the controlled device.

10. The method of claim 2, further comprising:

determining that the controlled device cannot identify device data of the controlling device;

mapping the device data of the controlling device according to the logic database to obtain corresponding converted data; and sending the converted data to the controlled device.

11. The method of claim 1, wherein the establishing the logic database of the controlled device includes:

establishing a correspondence between the instruction data and the logic instruction name; and saving the correspondence between the instruction data and the logic instruction name to generate a logic instruction database of the controlled device.

12. The method of claim 1, wherein the state change data includes data extracted according to a change in a display interface of the controlling device.

13. An apparatus comprising:

one or more processors; and one or more memories storing thereon computer-readable instructions that, when executed by the one or more processors, cause the one or more processors to perform acts comprising:

acquiring device data based on an interaction that a state of a controlled device changes corresponding to an operation instruction of a controlling device, the device data being related to the state of the controlled device;

extracting, from the operation instruction of the controlling device, instruction data corresponding to an operation parameter;

using the instruction data as attribute information of the controlled device;

extracting, from state change data of the controlled device, state change information corresponding to a logic parameter;

determining a logic instruction name based on the extracted state change information;

using the logic instruction name as logic information of the controlled device; and establishing a logic database of the controlled device, the logic database including a correspondence between the attribute information and the logic information.

14. The apparatus of claim 13, wherein the acquiring the device data based on the interaction includes:

determining that interaction data is transmitted between the controlling device and the controlled device; and acquiring the device data according to the interaction data.

15. The apparatus of claim 14, wherein the acquiring the device data according to the interaction data includes:

transmitting to the controlled device the operation instruction submitted by the controlling device;

determining that the controlled device responds to the operation instruction; and collecting the state change data and the operation instruction that are submitted by the controlling device.

16. The apparatus of claim 13, wherein the state change data includes:

state label data;

state type data; and state change data, wherein:

the state label data and the state type data are used for determining the logic instruction name or the logic state name; and the state change data includes state alteration data that is used for displaying the state of the controlled device in the controlling device.

17. One or more memories storing thereon computer-readable instructions that, when executed by one or more processors, cause the one or more processors to perform acts comprising:
  acquiring device data based on an interaction that an interface representing a controlled device changes corresponding to an operation instruction of a controlling device, the device data being related to a state of the controlled device;
  extracting, from the operation instruction of the controlling device, instruction data corresponding to an operation parameter;
  using the instruction data as attribute information of the controlled device;
  extracting, from state change data of the controlled device, state change information corresponding to a logic parameter;
  determining a logic instruction name based on the extracted state change information;
  using the logic instruction name as logic information of the controlled device; and
  establishing a logic database of the controlled device, the logic database including a correspondence between the attribute information and the logic information.

18. The one or more memories of claim 17, wherein the acquiring the device data includes:
  transmitting to the controlling device running state data submitted by the controlled device;
  determining that the controlling device responds to the running state data; and
  collecting the running state data and state change data that is submitted by the controlling device.

19. The one or more memories of claim 17, wherein the state change data includes data extracted according to a change in a display interface of the controlling device.

20. The one or more memories of claim 17, wherein the state change data includes:
  state label data; or
  state type data,
  wherein the state label data or the state type data is used for determining the logic instruction name.

* * * * *